United States Patent [19]
Shibata

[11] Patent Number: 5,871,164
[45] Date of Patent: Feb. 16, 1999

[54] FISHING SPINNING REEL HAVING A CAM SHAFT WITH A GROOVE OF NON-UNIFORM PITCH RECIPROCATING THE SPOOL

[75] Inventor: Takashi Shibata, Higashikurume, Japan

[73] Assignee: Daiwa Seiko, Inc., Tokyo, Japan

[21] Appl. No.: 901,960

[22] Filed: Jul. 29, 1997

[30]     Foreign Application Priority Data

Jul. 29, 1996   [JP]   Japan .................................. 8-008161

[51] Int. Cl.⁶ .................................................. A01K 89/01
[52] U.S. Cl. ...................................... 242/241; 242/183.6
[58] Field of Search ................................ 242/241, 242, 242/483.6

[56]               References Cited

U.S. PATENT DOCUMENTS 5,273,234   12/1993   Hitomi ..................................... 242/241

FOREIGN PATENT DOCUMENTS

| 617477 | 4/1961 | Canada ................................... 242/241 |
| 61-152269 | 9/1986 | Japan . |
| 63-2568 | 1/1988 | Japan . |
| 3007531 | 11/1994 | Japan . |

*Primary Examiner*—Katherine Matecki
*Attorney, Agent, or Firm*—Sughrue, Mion, Zinn, Macpeak & Seas, PLLC

[57]               ABSTRACT

In the body (6) of a spinning reel for fishing, a spool shaft (1) has a spool mounted at a tip end portion thereof and is attached to a slider (5) at a back end portion thereof. A traverse cam shaft (7) supported within the reel body has a traverse cam groove (8) provided thereon. The slider is engaged with the traverse cam groove so that the spool shaft freely slides back and forth within the reel body in association with rotation of a fishing reel handle (9). The traverse cam groove is formed so that the pitch thereof gradually increases in the longitudinal direction from a front portion of the traverse cam shaft to a rear portion thereof. The spool mounted at the tip end portion of the spool shaft has a barrel portion (2') of uniform diameter extending between a front flange portion (3) and a rear flange portion (4). As a result of the traverse cam groove having a non-uniform, increasing pitch, there is a gradual increase in the amount of fishing line wound on the spool toward the front portion of the spool, even though the diameter of the barrel portion of the spool is uniform.

10 Claims, 2 Drawing Sheets

# FISHING SPINNING REEL HAVING A CAM SHAFT WITH A GROOVE OF NON-UNIFORM PITCH RECIPROCATING THE SPOOL

The following disclosure is based on Japanese Utility Model Application No. Hei. 8-8161, filed on Jul. 29, 1996, which is incorporated into this application by reference.

BACKGROUND OF THE INVENTION

1. Field of the Invention

This invention relates to fishing reels, and more particularly to an improved structure for reciprocating the spools of spinning reels.

2. Description of the Related Art

Japanese Utility Model Unexamined Publication No. Sho. 61-152269 discloses a spinning reel for fishing with a spool having a tapered surface. Specifically, the spool has a so-called "forward tapered surface" in which the diameter of a winding barrel portion of the spool gradually decreases from a rear portion thereof toward a front portion thereof. Such a tapered construction lightens the resistance of the fishing line when it is let out, rendering casting far easier than otherwise. Japanese Utility Model Registered Publication No. 3007531 discloses a different taper design, wherein the diameter of the winding barrel portion gradually decreases from the front portion toward the rear portion. In the case of this design, the so-called "inverse tapered surface" prevents the fishing line from collapsing when the fishing line is let out.

Japanese Utility Model Examined Publication No. Sho. 63-2568 discloses an innovation relating to the cam shaft of a fishing reel. According to the publication, a traverse cam shaft for reciprocating a spool back and forth has a cam groove with a longitudinal pitch that gradually increases from a front portion toward a rear portion. As a result, the line let-out resistance of the fishing line wound around the spool is reduced.

However, even though designing the winding barrel portion to have a forward tapered surface can lighten the line resistance during casting, when the fishing line is cast, the wound line in the vicinity of a spool front flange may collapse forwardly, resulting in a large amount of the wound line being let out at once. This is caused by various factors, including (i) resistance between the line windings during the casting operation, and (ii) variations in the line, such as in the width of the line, the tension in the line, and the like. As a result, the fishing line cannot be let out smoothly after all, which, among other drawbacks, has a negative influence upon the casting distance.

On the other hand, use of the inverse tapered surface design for the winding barrel portion has a stabilizing effect on the wound fishing line and tends to prevent the fishing line from collapsing forwardly during casting. However, the inverse taper causes the line let-out resistance to increase, which, in turn, negatively impacts the casting distance, just as above.

Further, both the forward and the inverse tapered surface designs have a drawback in that special cutting or tooling is necessary to shape the spool to have the forward tapered surface or the inverse tapered surface. This increases the cost of manufacture of the spool, which is itself another problem.

The conventional approach, described above, of changing the pitch of the cam groove of the traverse cam shaft is designed to increase the amount of wound line from the front portion of the spool toward the rear portion thereof, whereby the line let-out resistance is reduced. This approach, however, also gives rise to the line-collapsing phenomenon.

SUMMARY OF THE INVENTION

In view of the foregoing, an object of the invention is to improve upon the conventional designs described above. A further object is to provide a spinning reel having a spool with a winding barrel portion of uniform diameter, to thereby reduce the cost of manufacture of the spool. It is yet another object of the invention to reliably prevent the phenomenon whereby the fishing line collapses when the line is let out during casting.

The foregoing and other objects of the invention are solved by a fishing spinning reel that includes a reel body, a spool shaft within the reel body, and a spool mounted to a front portion of the spool shaft and having a first flange at the front side of the spool, a second flange at the rear side thereof, and a winding barrel portion between the first and second flanges. A traverse cam shaft supported by the reel body rotates in association with the rotation of a handle also mounted to the reel body. A slider attached to the spool shaft is engaged with the traverse cam groove so that the spool shaft freely slides back and forth as the traverse cam shaft rotates. The traverse cam groove is formed so that a pitch in the longitudinal direction thereof gradually increases from a back portion toward a front portion. Finally, the diameter of the winding barrel portion of the spool is uniform in thickness between its end flanges.

BRIEF DESCRIPTION OF THE DRAWING FIGURES

DETAILED DESCRIPTION OF THE PREFERRED EMBODIMENTS

Figure 1:
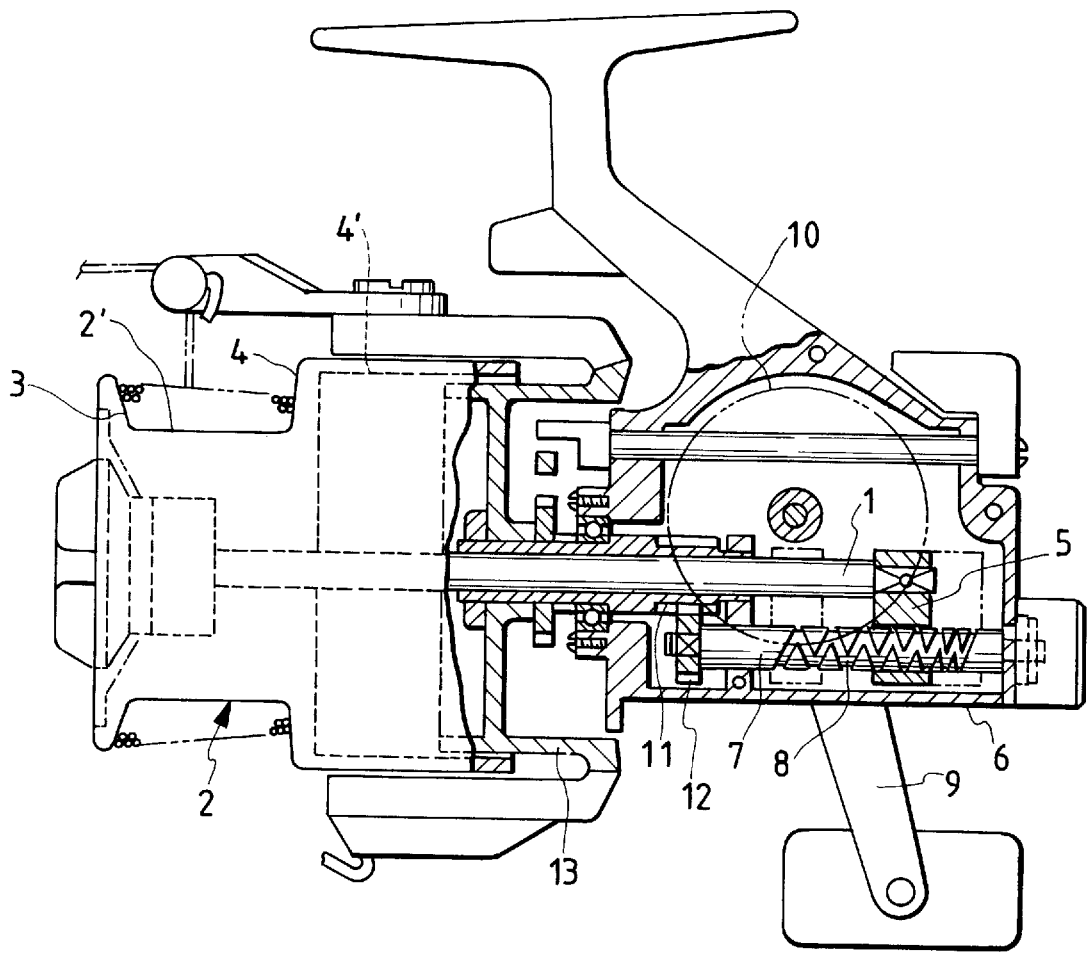
FIG. 1 is a front view, in partial cross-section, of a spinning reel according to the invention.
Figure 2:
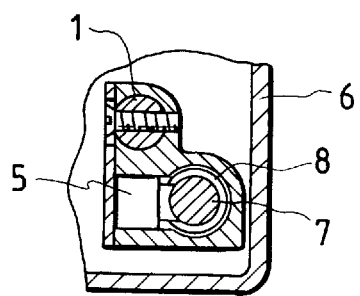
FIG. 2 is a sectional view showing specific components of the reel shown in FIG. 1.

Preferred embodiments of the invention will be described with reference to the accompanying drawings. A spool 2 extending forward from a reel body 6 is mounted to the tip end portion of a spool shaft 1. The spool 2 is provided with a front flange 3 at the front side thereof and a rear flange 4 at the rear side thereof. A skirt portion 4' extends rearward from the rear flange 4 in the direction of the reel body 6. A barrel portion 2', onto which fishing line is wound, extends with a substantially constant diameter between the front flange 3 and the rear flange 4.

Within the reel body 6, a slider 5 attached at the rear end portion of the spool shaft 1 engages with a traverse cam groove 8 formed on a traverse cam shaft 7, which is supported parallel to the spool shaft 1. The traverse cam groove 8 rotates by means of a conventional drive mechanism, which includes, e.g., a rotor 13, a drive gear 10, a pinion 11, and an interlocking gear 12, in association with a handle 9 mounted to the reel body 6.

The traverse cam shaft 7 is formed so that a pitch in a longitudinal direction (the axial direction) of the traverse cam groove 8 gradually increases from a rear portion thereof toward a front portion thereof. When the handle 9 of the fishing reel is rotated, the spool 2 linearly reciprocates and a rotor 13 rotates, causes a fishing line to be wound onto the spool. Given the increasing pitch of the traverse cam groove 8, the fishing line is wound onto the essentially cylindrical barrel portion 2' with an inverse tapered shape. As such, when a given amount of fishing line is wound on the spool, even though the barrel portion 2' of the spool 2 is cylindrical, the envelope of the fishing line is angled conically. The amount of fishing line wound on the spool gradually increases from the rear portion toward the front portion in the wound barrel portion 2', as shown in chain line of FIG. 1. In other words, the number of windings of fishing line per unit of axial length in the barrel portion increases with distance from the rear flange 4.

According to the invention, the traverse cam groove 8 is formed so that a pitch of the traverse cam groove 8 gradually increases from the rear portion of the traverse cam shaft 7 toward the front portion thereof and a diameter of the winding barrel portion 2' of the spool 2 is uniformly formed.

Such a design ensures that the fishing line is let out in a problem-free manner, and reliably avoids the line-collapsing phenomenon during casting operations. Further, it is unnecessary to perform special processing of the spool, since the spool need not be tapered. Therefore, the invention not only simplifies the construction of the spool but also provides a fishing reel with which it is possible to perform longer and smoother casting operations.

The invention is constituted so that the spool has a uniform diameter, and the traverse cam shaft for reciprocating the spool has a groove pitch that gradually increases from the front portion toward the rear portion. Therefore, the invention reliably prevents the fishing line from collapsing and lets out the fishing line in a problem-free manner. In addition, the cost of manufacture for the spool is reduced.

Figure 3:
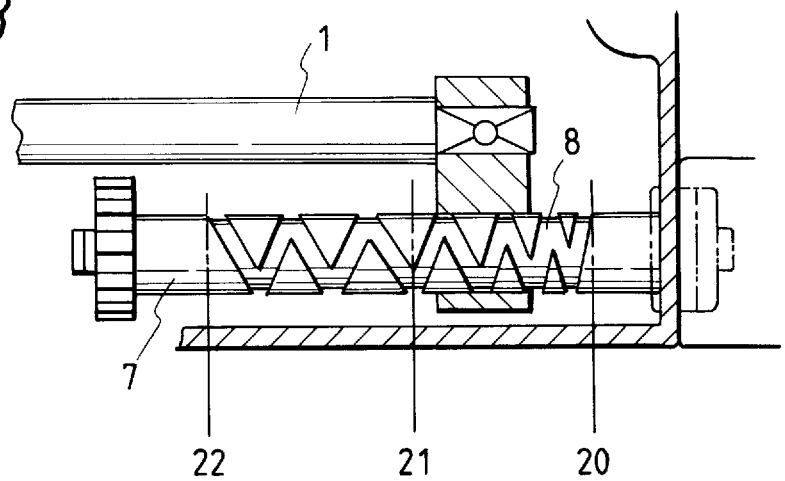
FIG. 3 is an enlarged view of a traverse cam shaft showing a modification of the embodiment according to the invention.
Figure 4:
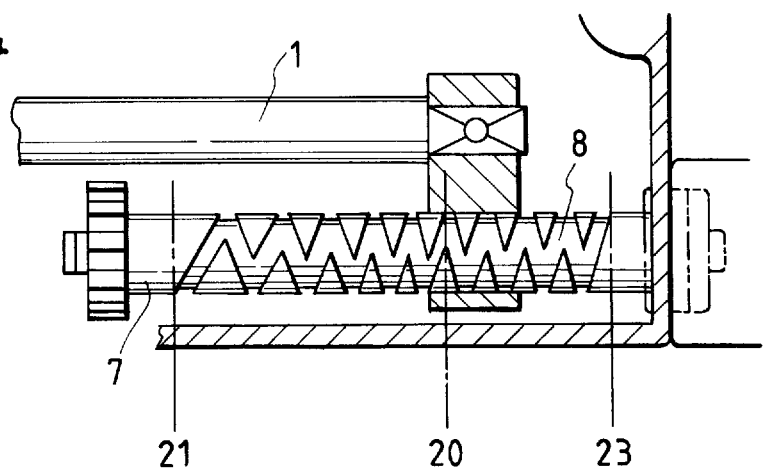
FIG. 4 is an enlarged view of the traverse cam shaft showing a modification of the embodiment according to the invention.
Figure 5:
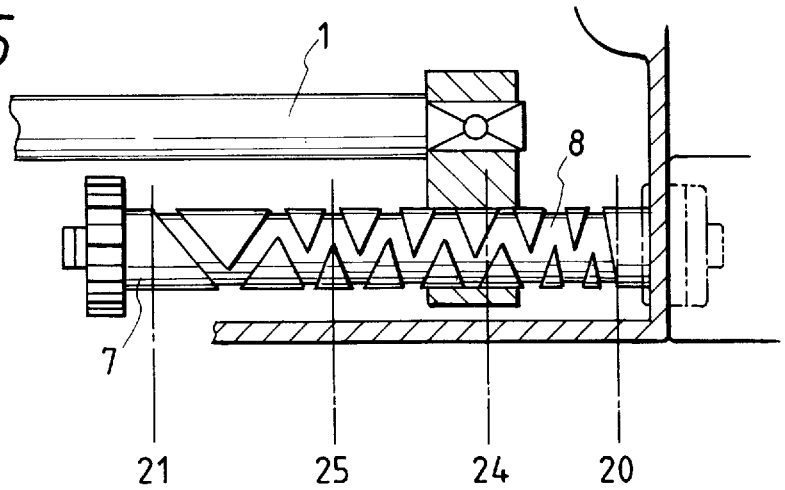
FIG. 5 is an enlarged view of the traverse cam shaft showing a modification of the embodiment according to the invention.

In addition, FIGS. 3 to 5 shows a modification of the embodiment, according to the present invention. As shown in FIG. 3, the traverse cam shaft may has a groove pitch that gradually increases from a first axial location 20 to a second axial location 21 and is uniform from the second axial location 21 to a third axial location 22. Further, as shown in FIG. 4, the traverse cam shaft may has a groove pitch that is uniform from a fourth axial location 23 to the first axial location 20 and gradually increases from the first axial location 20 to the second axial location 21. Additionally, as shown in FIG. 5, the traverse cam shaft may has a groove pitch that gradually increases from the first axial location 20 to a fifth axial location 24 and from a sixth axial location 25 to the second axial location, and is uniform from the fifth axial location 24 to the sixth axial location 25.

What is claimed is:

1. A fishing spinning reel comprising:

a reel body;

a spool shaft longitudinally movable within said reel body and having a front portion and a rear portion;

a spool mounted to the front portion of said spool shaft;

a traverse cam shaft supported by said reel body, wherein said traverse cam shaft includes a traverse cam groove extending longitudinally from a front portion to a back portion of said traverse cam shaft, and wherein said traverse cam shaft is coupled to a handle of said spinning reel so as to be rotatable in association with rotation of the handle; and a slider attached at the rear portion of said spool shaft, wherein said slider is engaged with the traverse cam groove so as to be slidable in reciprocating manner in association with rotation of said traverse cam shaft;

wherein said traverse cam groove has a pitch in the longitudinal direction of said traverse cam shaft that gradually increases from the back portion to the front portion.

2. A fishing spinning reel according to claim 1, wherein said spool has a first flange at a front portion thereof, a second flange at the rear portion thereof, and a winding barrel portion extending between said first flange and said second flange, and wherein said winding barrel portion has a substantially constant diameter.

3. A fishing spinning reel according to claim 2, further comprising:

a rotor mounted to said reel body, wherein said rotor is coupled to the handle so as to be rotatable around said spool in association with rotation of the handle; and a fishline roller, coupled to said rotor, for feeding a fishing line to said spool during a fishline winding operation, wherein, following the fishline winding operation, an amount of fishing line wound on said winding barrel portion is gradually greater from said second flange toward said first flange.

4. A fishing spinning reel comprising:

a reel body;

a spool shaft mounted to reciprocate within said reel body;

a spool mounted at a first axial end of said spool shaft;

a cam shaft connected to a handle of said spinning reel and mounted to rotate within said reel body in accordance with rotation of said handle, wherein said cam shaft includes a first cam groove extending peripherally along said cam shaft from a first axial location to a second axial location; and a slider interconnecting said spool shaft and said cam shaft, wherein said slider is fixedly coupled to said spool shaft and slidably engaged with the first cam groove of said cam shaft and said slider causes said spool shaft to reciprocate in accordance with rotation of said cam shaft;

wherein the second axial location lies between said spool and the first axial location, and wherein said first cam groove has a pitch varying from a lesser pitch at the first axial location to a greater pitch at the second axial location.

5. A fishing spinning reel according to claim 4, wherein said first cam groove has an intermediate pitch at a location between the first axial location and the second axial location.

6. A fishing spinning reel according to claim 4, wherein the pitch of the first cam groove increases monotonically between the first axial location and the second axial location.

7. A fishing spinning reel according to claim 6, wherein the pitch increases linearly between the first axial location and the second axial location.

8. A fishing spinning reel according to claim 4, wherein said cam shaft further includes a second cam groove extending peripherally along said cam shaft from a second axial location to the third axial location, the third axial location lying between said spool and the second axial location;

wherein said slider is slidably engaged with the second cam groove of said cam shaft; and wherein said second cam groove has a substantially uniform pitch from the second axial location to the third axial location.

9. A fishing spinning reel according to claim 4, wherein said cam shaft further includes a third cam groove extending peripherally along said cam shaft from a fourth axial location to the first axial location, the fourth axial location lying opposite side to the second axial location with respect to the first axial location;

wherein said slider is slidably engaged with the third cam groove of said cam shaft; and wherein said third cam groove has a substantially uniform pitch from the fourth axial location to the first axial location.

10. A fishing spinning reel according to claim 4, wherein said cam shaft further includes a fourth cam groove extending peripherally along said cam shaft from a fifth axial location to the sixth axial location, the fifth and sixth axial locations lying between the first axial location and the second axial location;

wherein said slider is slidably engaged with the fourth cam groove of said cam shaft; and wherein said fourth cam groove has a substantially uniform pitch from the fifth axial location to the sixth axial location.

\* \* \* \* \*